United States Patent [19]

Sakakibara et al.

[11] Patent Number: 4,807,934
[45] Date of Patent: Feb. 28, 1989

[54] DEVICE FOR MOVING UP AND DOWN AND TILTING A HEADREST OF A VEHICLE SEAT

[75] Inventors: Kazuo Sakakibara; Toshiaki Shimogawa, both of Okazaki; Satosi Kuwakado; Koji Imai, both of Nukata; Toshikazu Ina, Nagoya, all of Japan

[73] Assignee: Nippon Soken, Inc., Nishio, Japan

[21] Appl. No.: 146,126

[22] Filed: Jan. 20, 1988

[30] Foreign Application Priority Data

Jan. 23, 1987 [JP] Japan ................................. 62-7620

[51] Int. Cl.$^4$ ................................................ A47C 1/10
[52] U.S. Cl. ..................................... 297/403; 297/408; 297/410
[58] Field of Search ............... 297/408, 409, 403, 410, 297/391

[56] References Cited

U.S. PATENT DOCUMENTS

| 955,094 | 4/1910 | McNeel | 297/403 |
|---|---|---|---|
| 2,668,581 | 2/1954 | Luketa | 297/409 X |
| 3,065,029 | 11/1962 | Spound et al. | 297/391 |
| 3,345,107 | 10/1967 | Homier et al. | 297/410 |
| 3,427,073 | 2/1969 | Downs et al. | 297/410 X |
| 4,222,608 | 9/1980 | Maeda | 297/410 |
| 4,668,014 | 5/1987 | Boisset | 297/410 |
| 4,669,780 | 6/1987 | Sakakibara et al. | 297/410 |
| 4,711,494 | 12/1987 | Duvenkamp | 297/403 |

FOREIGN PATENT DOCUMENTS

| 2925781 | 1/1981 | Fed. Rep. of Germany | 297/408 |
|---|---|---|---|
| 3545142 | 6/1987 | Fed. Rep. of Germany | 297/391 |
| 59-14530 | 1/1984 | Japan . | |
| 60-244632 | 12/1985 | Japan . | |
| 61-249411 | 11/1986 | Japan . | |

Primary Examiner—Peter A. Aschenbrenner
Assistant Examiner—Thomas A. Rendos
Attorney, Agent, or Firm—Cushman, Darby & Cushman

[57] ABSTRACT

A device for moving up and down and tilting a headrest of a vehicle seat having a driven shaft for moving the headrest up and down and a support member for tilting the headrest. The drive shaft is operatively connected to leg members fixed to the headrest, and provided in a backrest of the vehicle seat. The support member is provided below the driven shaft. A drive mechanism drives the driven shaft to move the headrest up and down relative to the backrest, and a tilting mechanism rotates the leg members about the support member to tilt the headrest to a back of the seat backrest.

12 Claims, 15 Drawing Sheets

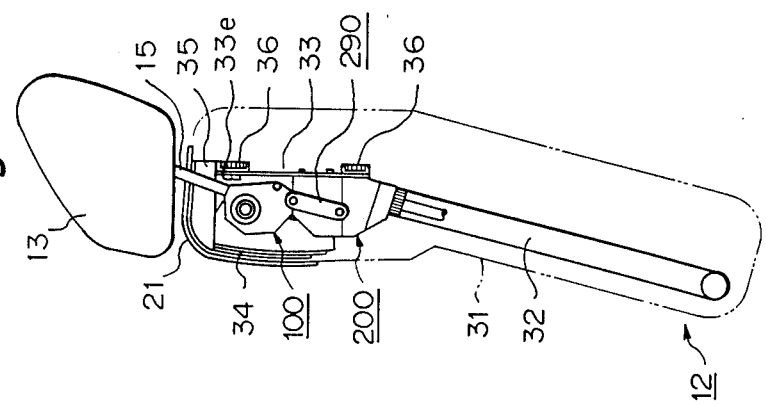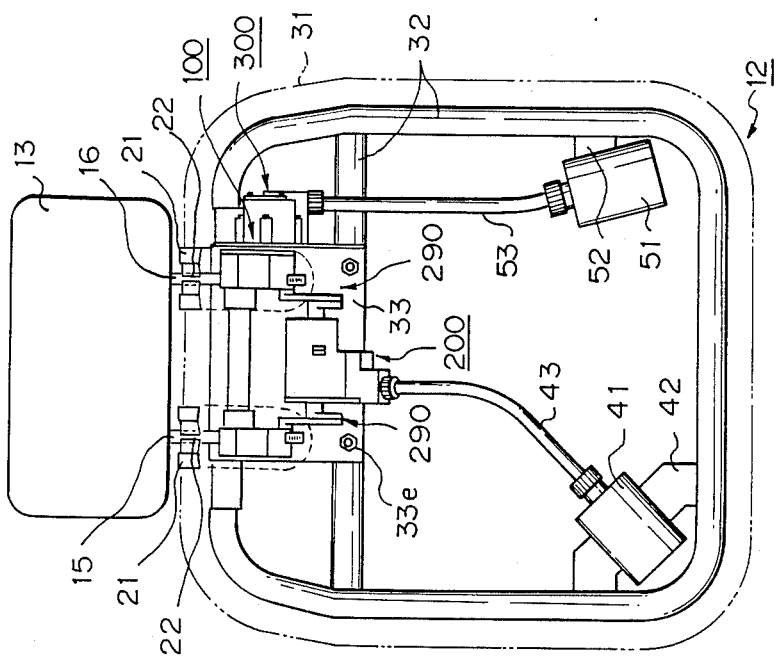

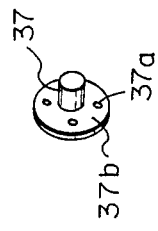
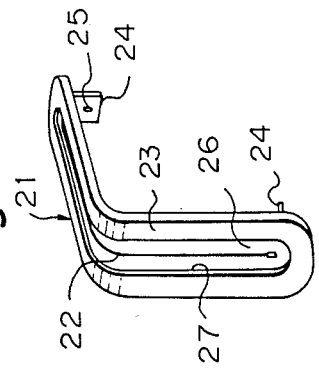
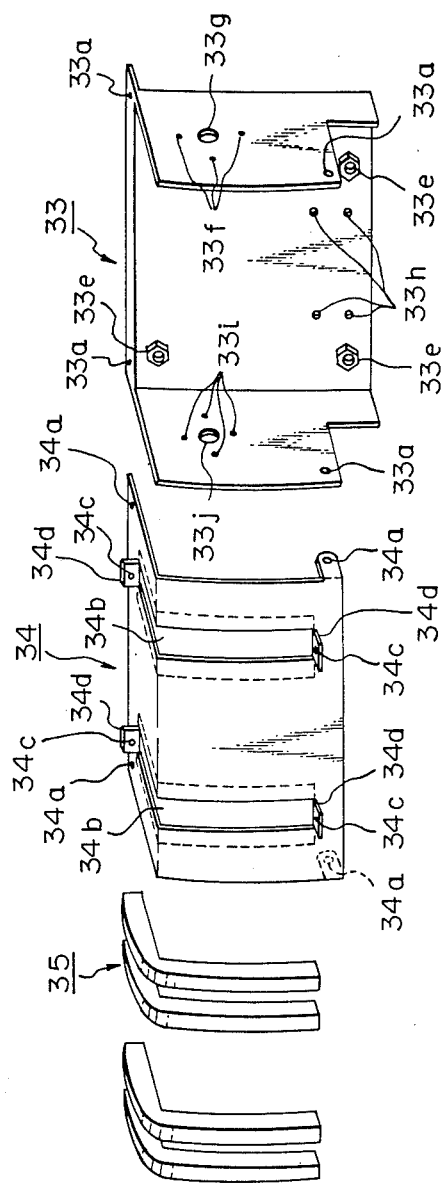

DEVICE FOR MOVING UP AND DOWN AND TILTING A HEADREST OF A VEHICLE SEAT

BACKGROUND OF THE INVENTION

1. Field of the Invention

The present invention relates to a headrest provided at an upper portion of a backrest of a seat mounted on a vehicle, and more particularly to a device for moving up and down and tilting the headrest relative to the backrest.

2. Description of the Related Art

When a backrest of a front seat of a vehicle is tilted backward to form, together with a rear seat cushion, a flat, fully reclined support for the seat occupant, a headrest provided on the front seat backrest must be moved to a position at which it will not collide with the rear seat cushion when the backrest of the front seat is thus tilted backward. Also, when the vehicle is driven in reverse, for example, the headrest of the front seat backrest may intrude into the field of vision of the driver, and therefore, in this case, the headrest should be moved out of the way to a position below the upper portion of the seat backrest.

In consideration of the above points, Japanese Unexamined Patent Publication No. 60-244632 disclosed a vehicle seat having a headrest which can be tilted to a position adjacent to a back face of a front seat backrest. However, this headrest of the vehicle seat cannot be moved to such a position on the seat backrest until the headrest is first lifted to an upper limit position at which the leg members of the headrest are released from a stopper in the seat backrest, and such a movement is time-consuming and cumbersome, particularly when the headrest has been set at a low position relative to the top of the seat backrest.

Japanese Unexamined Patent Publication No. 61-249411 discloses a construction in which a headrest of a front seat backrest is tilted by a mechanism which also moves the headrest up and down. However, in this construction, the leg members of the headrest interfere with an inner surface of the backrest if the headrest is not lifted to a certain extent, and therefore, the time needed to move the headrest to a predetermined position is relatively long. Conversely, if the headrest is constructed so that it can be tilted without first lifting, a larger space in the front seat backrest must be allowed to accommodate the necessary mechanism.

SUMMARY OF THE INVENTION

Therefore, an object of the present invention is to provide a device by which, when a headrest is moved to a position adjacent to a back of a front seat backrest, the leg members of the headrest do not interfere with an inner wall of the backrest, the space for housing the leg members in the backrest is reduced, and the time needed for moving the headrest is shortened.

According to the present invention, there is provided a device for moving up and down and tilting a headrest having at least one leg member inserted in the seat backrest, the device comprising a rotatable driven shaft provided in the seat backrest and operatively connected to the leg member, a drive mechanism for driving the driven shaft, a support member provided below the driven shaft, and a mechanism for tilting the leg member. In this construction, the drive mechanism drives the driven shaft to cause an axial rotation thereof, and thus moves the headrest up and down relative to the seat backrest. The leg member of the headrest is slidably held by the support member, which is rotated by the tilting mechanism to thus tilt the headrest through a predetermined angle relative to the seat backrest.

BRIEF DESCRIPTION OF THE DRAWINGS

The present invention may be more fully understood from the description of preferred embodiments of the invention set forth below, together with the accompanying drawings in which;

FIG. 4 is a rear view of an inner construction of the vehicle seat as an embodiment of the present invention;

FIG. 5 is a side view of the inner construction of the vehicle seat shown in FIG. 4;

FIG. 6 a perspective view of a frame cover;

FIG. 7 is a disassembled perspective view of a frame, a frame cover, and a spacer;

FIG. 8 is a perspective view of a support shaft;

DESCRIPTION OF THE PREFERRED EMBODIMENTS

Figure 1:
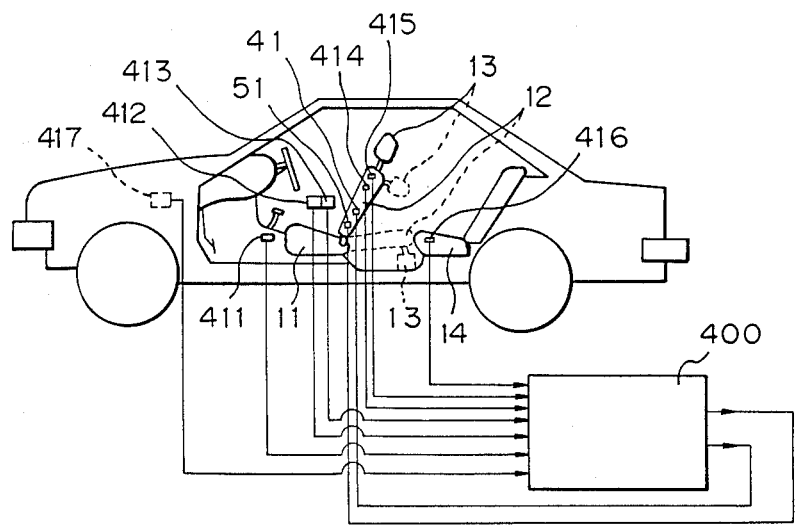
FIG. 1 is a schematic view of a vehicle seat and a control system.

The present invention is now described below with reference to an embodiment shown in the drawings.

FIG. 1 shows a vehicle having a seat to which an embodiment of the present invention is applied. In this drawing, a front seat has a seat cushion 11, a backrest 12 rotatably connected to the seat cushion 11, and a headrest 13 provided at an upper portion of the backrest 12 and capable of being moved up and down and tilted relative to the backrest 12. The headrest 13 is usually in an upright position relative to the upper face of the backrest 12, but can be moved to a position at the back of the backrest 12, as shown by a broken line, by a switching operation described later, when the vehicle is driven in reverse. In a state in which the backrest 12 is tilted backward to bring it to substantially the same level as a seat cushion of the rear seat, as shown by a broken line, the headrest 13 is tilted to a position at the back of the backrest 12. The remaining construction shown in FIG. 1 will be described later.

Figure 2:
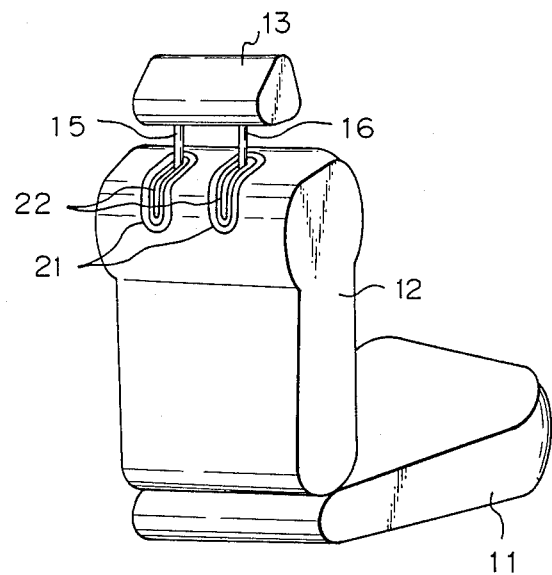
FIG. 2 is a perspective view of the vehicle seat back wherein the headrest is in an upright position relative to the seat back.
Figure 3:
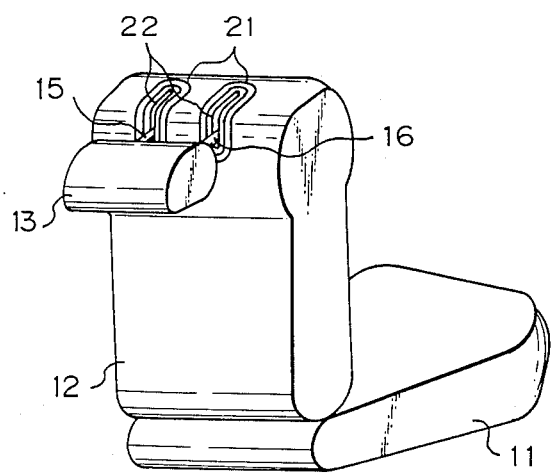
FIG. 3 is a perspective view of the vehicle seat back wherein the headrest is in a horizontal position relative to the seat back.

FIGS. 2 and 3 are oblique views of the front seat from the rear thereof. In the drawings, the headrest 13 is provided with a pair of leg members 15 and 16 extending downward therefrom. These leg members 15, 16 are inserted in the backrest 12 through slits 22, 22, of covers 21, 21 provided on the upper portion of the backrest 12, and are connected to a support mechanism 100 described later. The covers 21 are L-shaped and fitted to the upper portion of the backrest 12. As shown in FIG. 2, the headrest 13 is either in an upright position in which the leg members 15, 16 are in contact with the upper end portions of the slits 22, 22, or, as shown in FIG. 3, in a horizontal position in which the leg members 15, 16 are in contact with the lower end portions of the slits 22, 22, for example, when the vehicle is driven in reverse.

The cover 21 is clearly shown in FIG. 6, wherein the body 23 of the cover 21 has been bent into an L-shape. Fitting plates 24, 24 are fixed on inner faces of the upper and lower end portions of the body 23, respectively, and provided with a hole 25, respectively. The slit 22 is formed in a slit member 26 fixed to the rear face of the body 23, and is positioned in the center of a slot 27 provided in the center of the body 23. The cover 21 is fitted to a seat cover 31 covering the outer surface of the backrest 12, and fixed to a frame provided in the backrest 12, as described later.

FIGS. 4 and 5 show the backrest 12 in a state in which the seat cover 31 has been removed. As shown in the Figures, the leg members 15, 16 of the headrest 13 extend into a support mechanism 100 through the slits 22, 22, respectively, to be movably supported by the support mechanism 100. The headrest 13 is tilted by a tilting mechanism 200, and moved up and down by a drive mechanism 300. An outer frame member 32 forms the outline of the backrest 12, and a channel-shaped frame 33 is fixed to the outer frame member 32. The support mechanism 100 and the tilting mechanism 200 are connected to an inner side of the frame 33, and the drive mechanism 300 is attached to an outer side of the frame 33. The support mechanism 100 is rotatably supported by the frame 33 to be able to rotate about a horizontal axis, as described later. The tilting mechanism 200 rotates the support mechanism 100 through a link mechanism 290, and a motor 41 for driving the tilting mechanism 200 is fixed to a lower portion of the outer frame member 32 through a bracket 42. The tilting mechanism 200 is driven by an output shaft of the motor 41 connected thereto through a flexible shaft provided in a tube member 43. A motor 51 for driving the drive mechanism 300 is fixed to an lower portion of the outer frame member 32 through a bracket 52, and the drive mechanism 300 is driven by an output shaft of the motor 51 connected thereto through a flexible shaft provided in a tube member 53.

FIG. 7 shows the frame 33, a cover frame 34 fixed to the frame 33, and spacers 35 disposed between the cover frame 34 and the cover 21 (FIG. 6), these members being shown in a disassembled state. The cover frame 34 is fixed to the frame 33 by aligning holes 34a formed in the cover frame 34 with holes 33a formed in the frame 33 and threadingly fitting screws in these holes 33a, 34a. The cover frame 34 has two openings 34b, each of which corresponds to the slit 22 (FIG. 6) of the cover 21. The spacers 35 are disposed on the upper surfaces of the cover frame 34 and at both sides of the opening 34b, as shown by the broken lines in FIG. 7. Fitting members 34d having a hole 34c are provided at both ends of the opening 34b of the frame 34. Accordingly, the cover 21 is fixed to the cover frame 34 by inserting the spacer 35 between the cover 21 and the cover frame 34, and aligning the hole 25 (FIG. 6) with the hole 34c of the cover frame 34 and threadingly fitting a screw in the holes 25 and 34c (see FIG. 5). Thus, the cover 21 is fixed to the cover frame 34 in such a manner that the screws and the like do not protrude above the surface of the seat.

The frame 33 is provided with a nut 33e, and is fixed to the outer frame member 32 by a bolt 36 threadingly fitted in the nut 33e, as shown in FIG. 5. The frame 33 is provided with a threaded hole 33f for fitting the drive mechanism 300 thereto, a hole 33g for accommodating an output shaft of the drive mechanism 300 therein, and a threaded hole 33h for fitting the tilting mechanism 200 thereto. The frame 33 also is provided with a threaded hole 33i for fitting a support shaft 37 thereto, and an opening 33j for inserting the support shaft 37 therein. The support shaft 37 rotatably supports the support mechanism 100 relative to the frame 33 as described later, and has a flange 37b having a fitting hole 37a which corresponds to the threaded hole 33i, as shown in FIG. 8.

FIGS. 9 through 12 show the support mechanism 100 and the drive mechanism 300.

As shown in the Figures, a housing 101 of the support mechanism 100 is rotatably supported at the frame 33 by the support shaft 37 and an output shaft 310 of the drive mechanism 300. The support shaft 37 and the output shaft 310 are aligned on the same horizontal plane, and rotatably support both sides, respectively, of the housing 101. Connecting shafts 131, 132 provided at lower portions of the housing 101 are connected to a link mechanism 290, and the housing 101 is rotated by the tilting mechanism 200 through the link mechanism 290. In a usual state, the tilting mechanism 200 is not operative, and thus the housing 101 is not rotated.

The housing 101 has a hollow shaft 102 which is positioned above the support shaft 37 and the output shaft 310, and extends in parallel to these shafts 37, 310. A driven shaft 103 is housed in the hollow shaft 102 to rotate about the axis thereof, and pins 104, 105 projecting in the axial direction are provided at the end faces of the shaft 103. These pins 104, 105 are engaged with recesses 106, 107 formed in the housing 101 so that the shaft 103 can be pivoted in the housing 101. The shaft 103 has pinion gears 108, 109 provided close to both ends thereof, respectively, and a gear 111 located between the pinion gear 109 and the pin 107. An input shaft 112 is provided on a line connecting the support shaft 37 and the output shaft 310, and is rotatably supported by the housing 101. In other words, the support shaft 37 and the input shaft 112 are support members provided below the driven shaft 103, and the housing 101 is rotated about these support members. The input shaft 112 has a gear 113 which meshes with the gear 111 of the driven shaft 103, and a pin 114 having a square section extends axially from an end face of the input shaft 112 to engage with a square section hole 318 formed in the output shaft 310 of the drive mechanism 300. Thus, when the output shaft 310 is rotated, the rotation thereof is transmitted to the input shaft 112 and thus the driven shaft 103 is rotated through the gears 111, 113.

Figure 11:
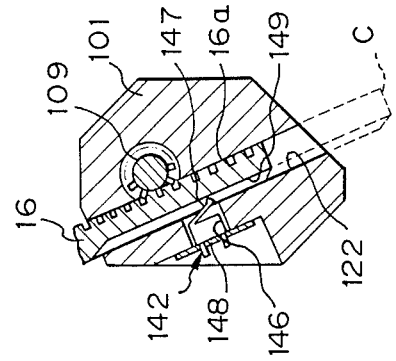
FIG. 11 is a sectional view taken along line XI—XI of FIG. 9.
Figure 10:
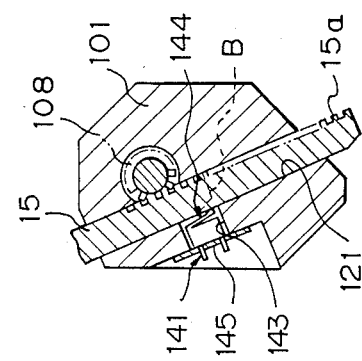
FIG. 10 is a sectional view taken along line X—X of FIG. 9.

The leg members 15, 16 of the headrest are slidably supported in support bores 121, 122 formed in the housing 101, as shown in FIGS. 10, 11. These leg members 15, 16 are provided with racks 15a, 16a which mesh with the pinion gears 108, 109 of the driven shaft 103. Therefore, when the driven shaft 103 is rotated, the leg members 15, 16 are moved up and down, and thus the headrest is moved up and down, relative to the seat backrest.

First and second limit switches 141, 142 are provided in the housing 101 for sensing whether the headrest 13 is located at either the upper or lower limit position, respectively. Namely, as shown in FIG. 10, the first limit switch 141 for sensing that the headrest 13 is located at the upper limit position is disposed in a bore 143 formed in the housing 101 and facing a side surface of the leg member 15. The first limit switch 141 is provided with a projecting member 144 which is located in an opening of the bore 143 and is constantly engaged with the leg member 15. An output terminal of the first limit switch 141 is fixed to an insulating plate 145 (a printed wiring board, for example) attached to the housing 101, and connected to a control circuit 400 (FIG. 1) described later. The projecting member 144 moves toward the lower end portion of the leg member 15 when the lower end portion of the leg member 15 is raised to the position shown by the broken line B in FIG. 10, and thus the first limit switch 141 is turned ON.

As shown in FIG. 11, the limit switch 142 for sensing that the headrest 13 is located at the lower limit position is disposed in a bore 146 formed in the housing 101 and facing a side surface of the leg member 16. The second limit switch 142 is provided with a projecting member 147 which is located in an opening of the bore 146 and normally engaged with a groove 149 of the leg member 16. But, when the leg member 16 is moved downward to the lower limit position, the projecting member 147 is moved out of the groove 149 and engaged with a portion of the leg member 16 which is above the groove 149. An output terminal of the second limit switch 142 is fixed to an insulating plate 148 provided in the housing 101, and connected to the control circuit 400, and when the lower end of the leg member 16 is brought to the position shown by the broken line C, the projecting member 147 is pressed back by engagement with the portion of the leg member 16 located above the groove 149 and thus the second limit switch 142 is turned ON.

Figure 9:
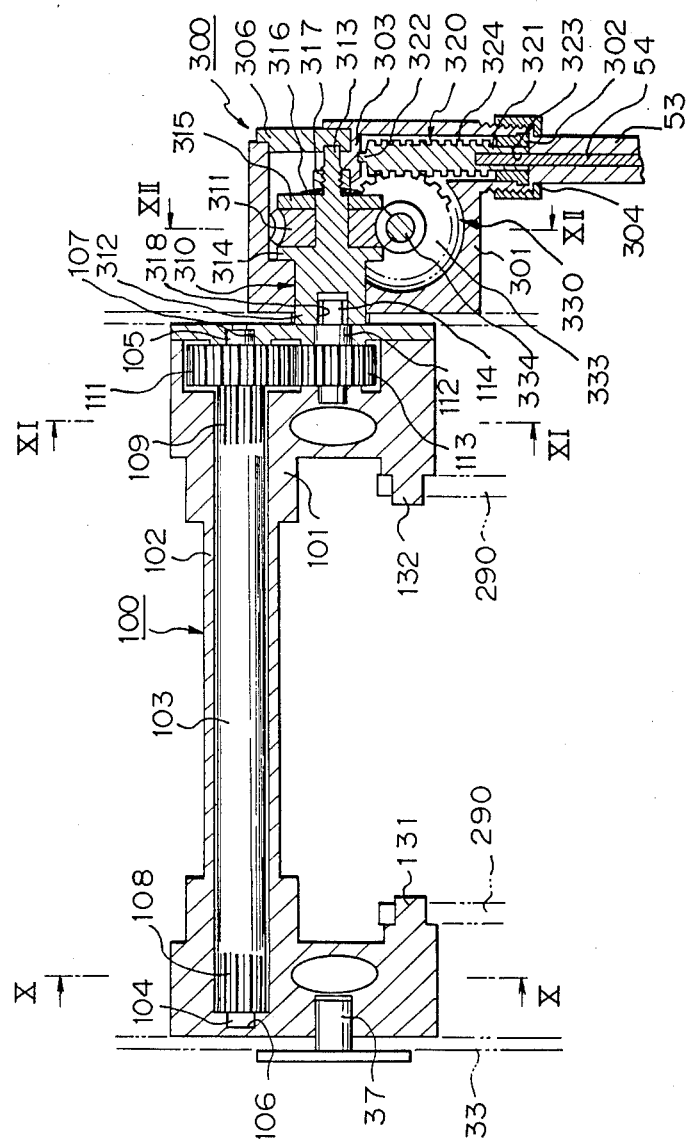
FIG. 9 is a sectional view of a drive mechanism and a tilting mechanism.
Figure 12:
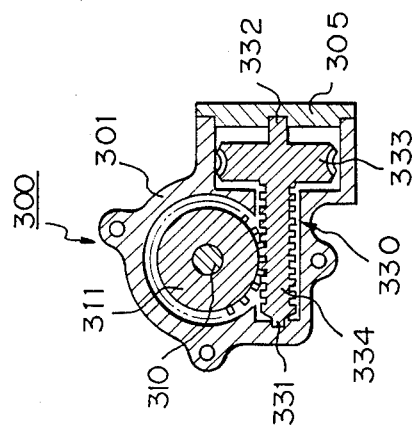
FIG. 12 is a sectional view taken along line XII—XII of FIG. 9.

As shown in FIGS. 9 and 12, the drive mechanism 300 is provided with an input shaft 320, an intermediate shaft 330, and an output shaft 310, assembled in a housing 301. A lower end 321 of the input shaft 320 is supported by a bearing 302 provided at a lower end of the housing 301, and an upper end 322 of the input shaft 320 is supported by an inner wall 303 of the housing 301, so that the input shaft 320 is rotatable in the axial direction. A tube member 53 is connected to the housing 301 through a screw 304 attached to a lower end of the housing 301, and a flexible shaft 54 inserted in the tube member 53 is fitted in an angular hole 323 formed in a lower portion of the input shaft 320. Therefore, a rotation of the motor 51 (FIG. 4) is transmitted to the input shaft 320 through the flexible shaft 54. The bearing 302 is fixed to the housing 301 by a screw 304.

Both end portions 331, 332 of the intermediate shaft 330 are supported by the housing 301 and a housing cover 305, respectively, so that the intermediate shaft 330 is rotatable in the axial direction. The intermediate shaft 330 is fitted with a worm wheel 333 and a worm 334. The worm wheel 333 meshes with a worm 324 formed on the input shaft 320, and the worm 334 meshes with a worm wheel 311 fitted on the output shaft 310.

The output shaft 310 has a large diameter portion 312 rotatably supported by the housing 301, and a small diameter portion 313 rotatably supported by a housing cover 306 fitted to the housing 301, so that the output shaft 310 is rotatable in the axial direction. The worm wheel 311 is rotatably fitted to the middle portion of the output shaft 310, and sandwiched between a flange portion 314 formed on the output shaft 310 and a friction plate 315 provided at the output shaft 310. The friction plate 315 is urged toward the worm wheel 311 by a belleville spring 316 fitted at the small diameter portion 313. The belleville spring 316 is fixed to the small diameter portion 313 by a nut 317 threadingly fitted to a screw portion of the small diameter portion 313, so that an urging force of the belleville spring 316 applied to the friction plate 315 is adjusted by rotating the nut 317 relative to the output shaft 310. The nut 317 is fixed to the output shaft so as to be freely rotatable.

A rotational force of the input shaft 320 is transmitted to the worm wheel 311 of the output shaft 310 through the intermediate shaft 330, so that the worm wheel 311 rotates together with the output shaft 310. If the rotational force transmitted to the worm wheel 311 overcomes a friction between the friction plate 315 and the worm wheel 311, the worm wheel 311 rotates relative to the output shaft 310 so that the output shaft 310 does not rotate according to the input shaft 320. The pin 114 of the input shaft 112 of the support mechanism 100 is inserted in an angular hole 318 formed in the large diameter portion 312 of the output shaft 310, so that the input shaft 112 rotates coaxially with the output shaft 310.

Figure 13:
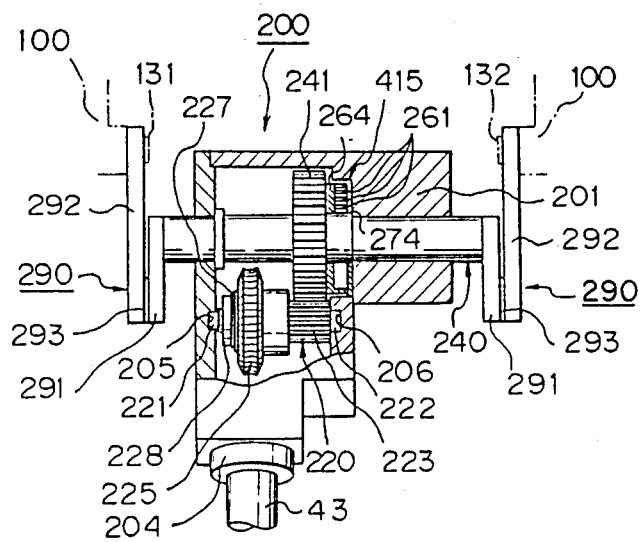
FIG. 13 is a sectional view of the tilting mechanism.
Figure 14:
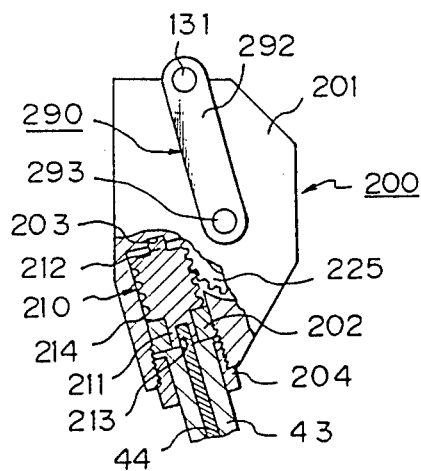
FIG. 14 is a side view of the tilting mechanism with a partially cutaway section showing a portion of an input shaft.
Figure 15:
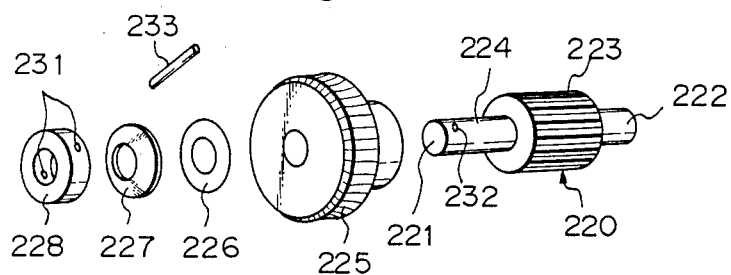
FIG. 15 is a disassembled perspective view of an intermediate of the tilting mechanism.

FIGS. 13 through 15 show the tilting mechanism 200 and the link mechanism 290.

The housing 201 of the tilting mechanism 200 is fixed to the frame 33 (FIG. 7).

The housing 201 of the tilting mechanism 200 is provided with an input shaft 210, an intermediate shaft 220, and an output shaft 240. Both ends of the output shaft 240 project from the housing 201, and are connected to the link mechanisms 290 provided on both sides of the tilting mechanism 200. The link mechanism 290 comprises a first arm 291 and a second arm 292, and one end of the first arm 291 is connected to one end of the output shaft 240, and the other end of the output shaft 240 is connected to a one end of the second arm 292, by a pin 293. The other end of the second arm 292 is fixed to a connecting shaft 131 or 132 of the support mechanism 100. As described later, when the output shaft 240 is rotated by the motor 41, the link mechanism 290 is operated to rotate the support mechanism 100.

A lower end 211 of the input shaft 210 is rotatably supported by a bearing 202 provided in the housing 201, and an upper end 212 of the input shaft 210 is rotatably supported by a recess 203 formed in the housing 210 so that the input shaft 210 is rotatably supported by the housing 201. A tube member 43 is connected to a lower end of the housing 201 by a screw 204, and a flexible shaft 44 is inserted in the tube member 43 and is fitted in an angular hole 213 formed in the lower end portion 211 of the input shaft 210. Therefore, rotation of the motor 41 (FIG. 4) is transmitted to the input shaft 210 through the flexible shaft 44. A worm 214 formed on the input shaft 210 meshes with a worm wheel 225 of the intermediate shaft 220. The bearing 202 is fixed by a fitting screw 204 threadingly inserted in the housing 201.

Both end portions 221, 222 of the intermediate shaft 220 are rotatably supported by recesses 205, 206 formed in the housing 201 so that the intermediate shaft 220 is rotatable in the axial direction. As shown in FIG. 15, a gear 223 is formed on the intermediate shaft 220, and a worm wheel 225 is rotatably fitted to a portion 224 close to the gear 223. A portion projecting from the worm wheel 225 of the intermediate shaft 220 is provided with a shim 226, a belleville spring 227, and a stop ring 228. The stop ring 228 is formed with holes 231 extending in a radial direction, and an end portion 221 of the intermediate shaft 220 is formed with a hole 232 corresponding to the holes 231. The stop ring 228 is fitted to the portion 224 in such a manner that the holes 231, 232 are aligned with each other, and a pin 233 is inserted in the holes 231, 232, so that the stop ring 228 is fixed to the intermediate shaft 220. Thus, the belleville spring 227 is supported by the stop ring 228 to press the worm wheel 225 against an end surface of the gear 223. The spring force of the belleville spring 227 is adjusted by changing the thickness of the shim 226.

The worm wheel 225 meshes with the worm 214 of the input shaft 210, and therefore, the worm wheel 225 is rotated by the rotation of the input shaft 210. Although the worm wheel 225 and the intermediate shaft 220 usually rotate as one body, if the rotational force transmitted to the worm wheel 225 overcomes the friction force between the worm wheel 225 and the gear 223, the worm wheel 225 rotates relative to the intermediate shaft 220.

The gear 223 of the intermediate shaft 220 meshes with a gear 241 formed on the output shaft 240. The output shaft 240 is rotatably supported by the housing 201, and both ends thereof are connected to the link mechanisms 290, respectively. Therefore, when a rotation of the intermediate shaft 220 is transmitted to the output shaft 240, the link mechanisms 290 are operated.

Figure 16:
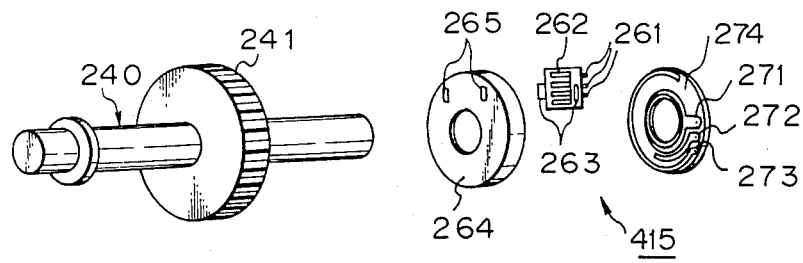
FIG. 16 is a disassembled perspective view of an output shaft of the tilting mechanism.

A headrest angular position sensor 415 is provided for sensing a rotational angle position of the arms 291, 292 of the link mechanism 290. The headrest angular position sensor 415 has a movable contact 261 comprising three projections, and first, second, and third fixed contacts 271, 272, and 273, as shown in FIG. 16. The movable contact 261 is formed on a contact plate 262 having a pair of tongues 263, which are inserted in slits 265 formed in a ring member 264 made of an electrical insulating material and fixed to the gear 241 so that the contact plate 262 is fixed to the ring member 264. The fixed contacts 271, 272, 273 are formed on a ring member 274 attached on an inner wall of the housing 201. The movable contact 261 is resilient and is in slidable contact with the fixed contacts 271, 272, 273 when the output shaft 240 is rotated.

The first fixed contact 271 is always in contact with the movable contact 261, ad the second fixed contact 272 is in contact with the movable contact 261 when the link mechanism 290 is positioned at bottom dead center, that is, when the headrest 13 is in a usual upright state. Therefore, at this time, the first and second fixed contacts 271, 272 are closed. When the link mechanism 290 is positioned at top dead center, i.e., when the headrest 13 is rotated backward to be positioned at the rear of the seat backrest, the third fixed contact 273 is in contact with the movable contact 261, and therefore, at this time, the first and third fixed contacts 271, 273 are closed.

The operation of the support mechanism 100, the tilting mechanism 200, and the drive mechanism 300 is described as follows.

When electric power is supplied to the motor 51, the flexible shaft 54 and the worm 324 are rotated coaxially, and this rotation is transmitted to the worm wheel 311 through the worm wheel 333 and the worm 334 of the intermediate shaft 330. Usually, the output shaft 310 rotates together with the worm wheel 311 as one body, so that the input shaft 112 of the support mechanism 100 is rotated to rotate the driven shaft 103 through the gears 111, 113, and accordingly, the leg members 15, 16 of the headrest 13 are moved up and down relative to the seat backrest by the pinion gears 108, 109. When the headrest 13 reaches the upper limit position, the contacts of the first limit switch 141 are closed, and when the headrest reaches the lower limit position, the contacts of the second limit switch 142 are closed. During these up and down movements of the headrest, if a force acting against the up and down movements is loaded on the headrest 13, and this force is greater than the friction force generated at the worm wheel 311, the output shaft 310, and the friction plate 315, the worm wheel 311 rotates relative to the output shaft 310 and thus the movement of the headrest 13 is stopped.

When electric power is supplied to the motor 41, the flexible shaft 44 and the input shaft 210 are rotated coaxially, and the rotation is usually transmitted to the output shaft 240 through the worm wheel 225 and the gear 223 of the intermediate shaft 220 so that the first and second arms 291, 292 of the link mechanisms 290 are rotated. This rotation of the arms 291, 292 causes the support mechanism 100 to be rotated about the axis of the output shaft 310 of the drive mechanism 300, the input shaft 112 and the support shaft 37 (FIG. 9). That is, the headrest 13 is tilted through an angle relative to the seat backrest.

Figure 17:
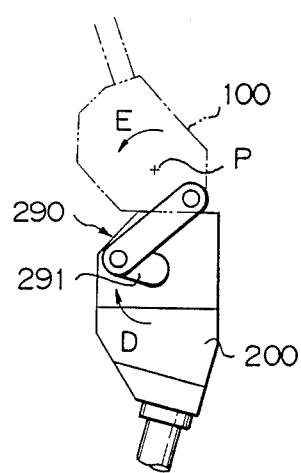
FIG. 17 is a side view of a link mechanism in a state in which the link mechanism is in a mean position between the top dead center and the bottom dead center positions.
Figure 18:
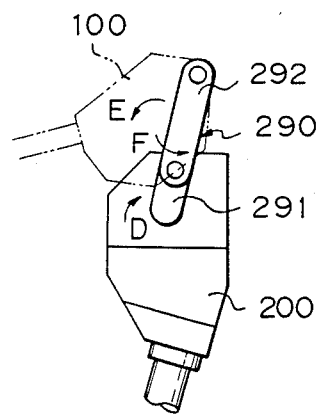
FIG. 18 is a side view of the link mechanism in a state in which the link mechanism is at the top dead center position.

In the state shown in FIG. 5, the link mechanism 290 is at bottom dead center, so that the headrest 13 is positioned in the upright position, and at this time, the first and second fixed contacts 271, 272 of the headrest angular position sensor 415 are closed. FIG. 17 shows a state in which the motor 41 is rotated so that the first arm 291 of the link mechanism 200 is rotated in the direction shown by the arrow D from the state shown in FIG. 5 and the support mechanism 100 is rotated in the direction shown by the arrow E about the support shaft (shown by a point P in FIG. 17). By a further rotation of the motor 41, as shown in FIG. 18, the first arm 291 of the link mechanism 290 reaches top dead center, so that the headrest 13 is tilted to the back of the seat backrest. At this time, the first and third fixed contacts 271, 273 of the headrest angular sensor 415 are closed. If the first arm 291 is further rotated in the direction shown by the arrow D from the state shown in FIG. 18, the second arm 292 is rotated in the direction shown by the arrow F, so that the support mechanism 100 is rotated in the reverse of the direction of the arrow E, and as a result, the headrest 13 is returned to the upright position.

Therefore, when the headrest 13 is angularly displaced between a state in which the headrest 13 is tilted to a back of the seat backrest and a state in which the headrest 13 is upright on the upper portion of the seat backrest, the first arm 291 is rotated in one direction, and accordingly, it is not necessary for the rotation direction of the motor 41 to be changed when the headrest is angularly displaced. When the first arm 291 is positioned at the top or bottom dead center, i.e., when the headrest 13 is at the upright position or tilted to the back of the seat backrest, the link mechanism 290 will not rotate even if there is an external force acting on the headrest 13 or the support mechanism 100. Therefore, the headrest 13 is stable at the above positions and cannot be rotated by an external force.

During this angular displacement of the headrest 13, the headrest 13 is rotated about the support shaft 37 and the input shaft 112, which are positioned below the pinion gears 108, 109 (FIG. 9). Therefore, the length of the portions of the leg members 15, 16 below the center of rotation thereof is shorter than in the prior art, so that a space required in the seat backrest for operation of the leg members 15, 16 is reduced in comparison with the prior art. This is explained below with reference to FIGS. 19 through 21.

Figure 19:
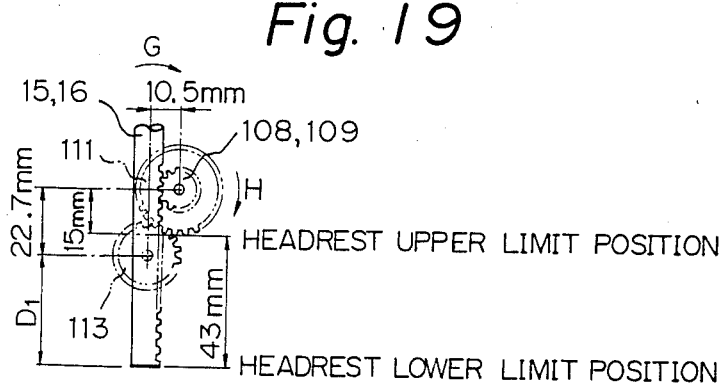
FIG. 19 a schematic view showing a positional relationship between a pinion for moving the headrest up and down and center of the headrest.
Figure 20:
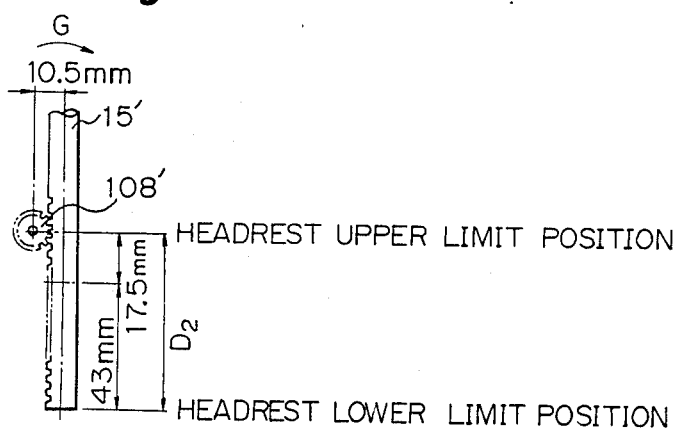
FIG. 20 is a schematic view showing a pinion gear for moving a headrest up and down and a leg member of a headrest of the prior art.
Figure 21:
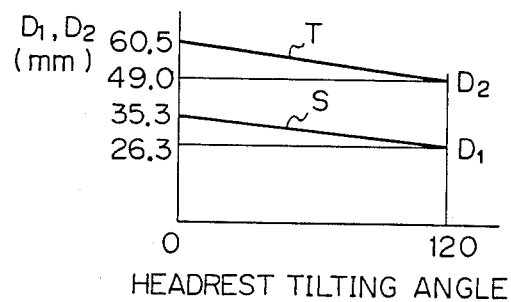
FIG. 21 a graph showing a relationship between an angular of the headrest and a length of a portion below the pinion gear of the leg member.

FIG. 19 shows the present embodiment, and FIG. 20 shows a prior art device. In FIG. 19, the gear 113 is provided with 22 teeth, the gear 111 is provided with 28 teeth, and the pinion gear 108 is provided with 11 teeth and has a shift coefficient of +0.5. The up and down stroke of the headrest 13 is 43 mm, and the radius of rotation of the leg members 15, 16 when the headrest 13 is positioned at the lower limit position is $D_1$. Note, to prevent the racks of the leg members 15, 16 from being dislodged from the pinion gears 108, 109 while the headrest 13 is angularly displaced, the lower end portions of the leg members 15, 16 must be positioned below the center of rotation of the pinion gears 108, 109 by more than 15 mm when the headrest 13 is at the upper limit position. Therefore, when the headrest 13 is at the lower limit position, the lower end portions of the leg members 15, 16 are located below the center of the pinion gears 108, 109 by 58 mm, and the radius of rotation $D_1$ of the leg members 15, 16 is 35.3 mm.

In this condition, if the headrest 13 is rotated in the direction of the arrow G, since the gear 113 is stationary, the gear 111 and the pinion gears 108, 109 are rotated in the direction of the arrow H due to the meshing of the gears 113, 111, so that the leg members 15, 16 are moved upward. Thus, when the angular displacement of the headrest 13 is 120°, the radius of rotation $D_1$ is 26.3 mm. This change of the radius of rotation D is shown by the solid line S in FIG. 21.

On the other hand, in a prior art device as shown in FIG. 20, the up and down stroke of the headrest is 43 mm, and the radius of rotation of the leg member 15' when the headrest 13 is located at the lower limit position is $D_2$. To prevent a rack formed on the leg member 15' from being dislodged from a pinion gear 108' during a rotational displacement of the headrest 13, the lower end portion of the leg member 15' must be positioned below the center of rotation of the pinion gear 108' by more than 17.5 mm when the headrest 13 is at the upper limit position. Therefore, when the headrest 13 is at the lower limit position, the lower end portion of the leg member 15' is positioned below the center of rotation of the pinion gear 108' by 60.5 mm, that is, the radius of rotation $D_2$ of the leg member 15' is 60.5 mm. If the headrest 13 is rotated in the direction of the arrow G, since the leg member 15' is rotated by meshing with the pinion gear 108', the radius of rotation $D_2$ is gradually reduced as shown by the solid line T in FIG. 21, to become 49 mm when the angular displacement is 120°.

As described above, the radius of rotation $D_1$ of the leg members 15, 16 in the embodiment is shorter than the radius of rotation D in the prior art. Therefore, according to this embodiment, a large space is not needed in the seat backrest to allow movement of the leg members 15, 16 when the headrest 13 is angularly displaced. Accordingly, the headrest 13 need not be moved up before being angularly displaced, which reduces the radius of rotation and thus decreases the time needed for an angular displacement of the headrest 13.

Figure 22:
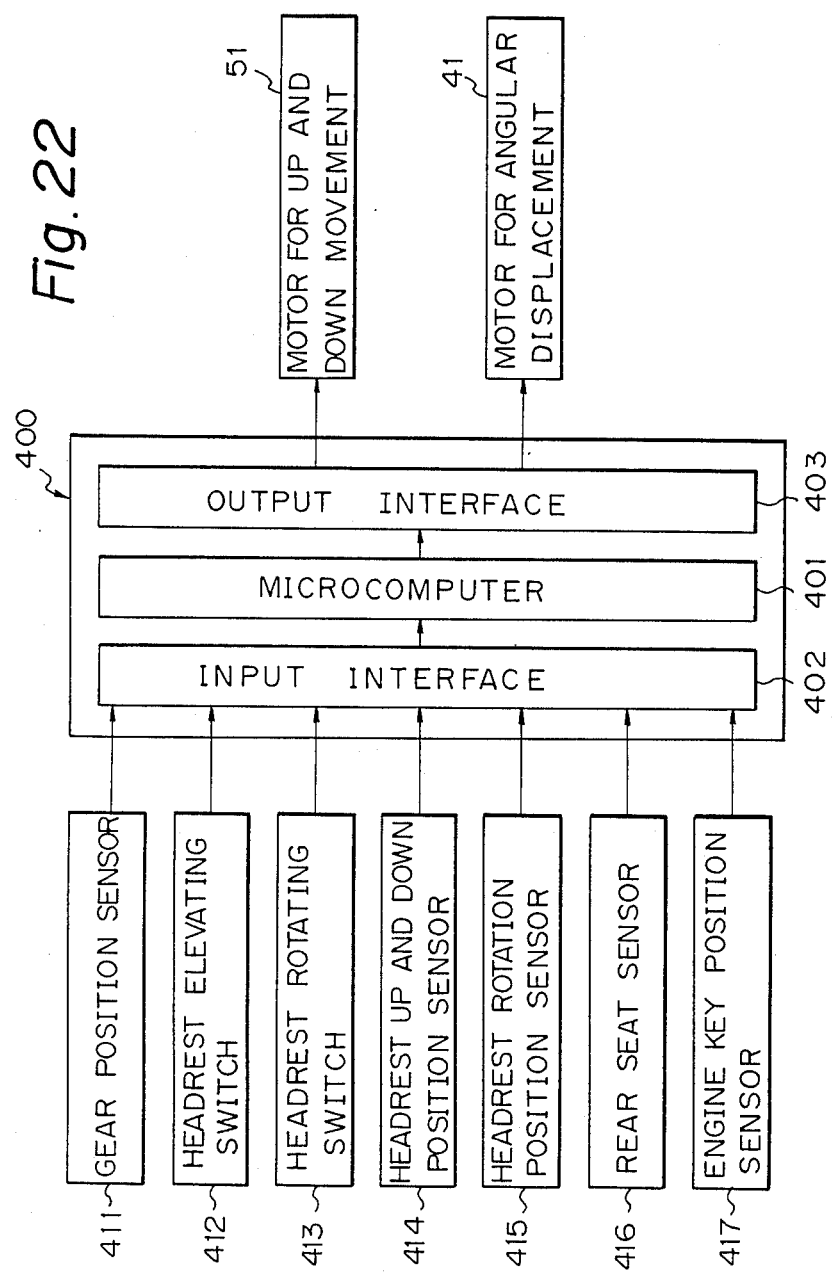
FIG. 22 is a diagram of the control system.

The construction of the control system for an angular displacement of the headrest 13 is described below with reference to FIGS. 1 and 22.

The control circuit 400 is provided with a microcomputer 401, which is connected to outside devices through an input interface 402 and an output interface 403. The input interface 402 is connected to a gear position sensor 411, a headrest elevating switch 412, a headrest rotating switch 413, a headrest up and down position sensor 414, a headrest rotation position sensor 415, a rear seat sensor 416, and an engine key position sensor 417, etc., to enable signals to be input from these sensors. The output interface 403 is connected to the motor 51 for up and down movement, and to the motor 41 for angular displacement.

The gear position sensor 411 senses a gear position of the shift lever. If the vehicle has an automatic transmission, the sensor senses the gear position R (reverse) or a gear position in a D (drive) range. The headrest elevating switch 412 is operated to move the headrest 13 up and down, and the headrest rotating switch 413 is operated to angularly displace the headrest 13 to the back of the seat backrest 12. The headrest elevating switch 412 and the headrest rotating switch 413 are provided at an appropriate position, for example, at the driver's seat. The headrest up and down position sensor 414 senses whether the headrest is positioned at the upper limit or at the lower limit, and is constructed by the first and second limit switches 141, 142 described above. The headrest rotation sensor 415 is provided at the tilting mechanism 200 as described above. That is, the headrest up and down position sensor 414 and the headrest rotation position sensor 415 are provided in the seat backrest 12 of the front seat. The rear seat sensor 416 senses whether or not there is a rider or any luggage on the rear seat cushion 14. The engine key position sensor 417 senses whether or not the engine key is in the ignition position.

FIG. 23 is a flowchart of a position control routine for the headrest 13 by the control circuit 400.

Figure 23A:
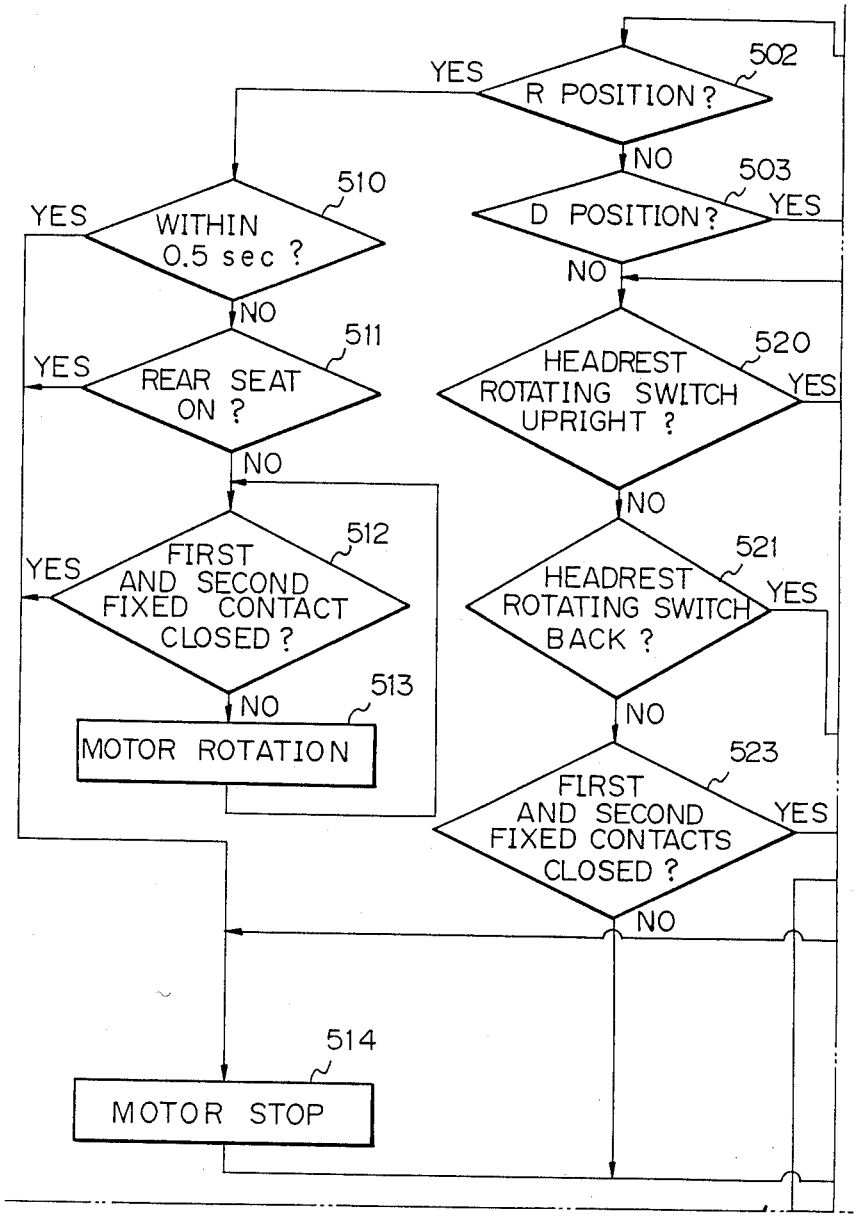
FIGS. 23A–23E comprise a flowchart of a control routine for controlling the headrest according to the present invention.
Figure 23B:
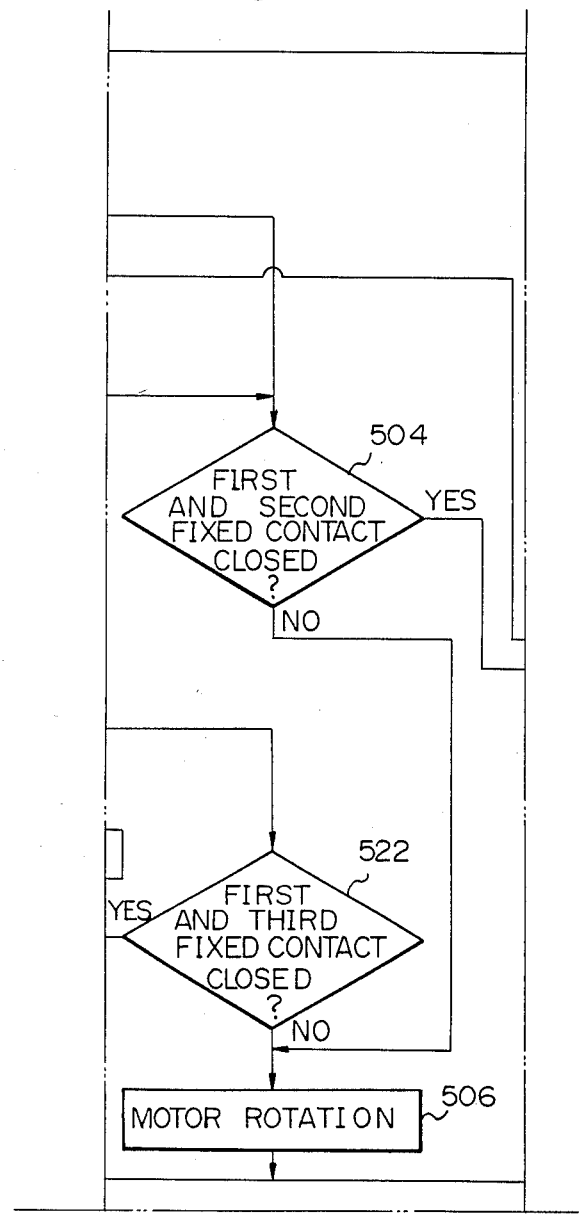
Figure 23C:
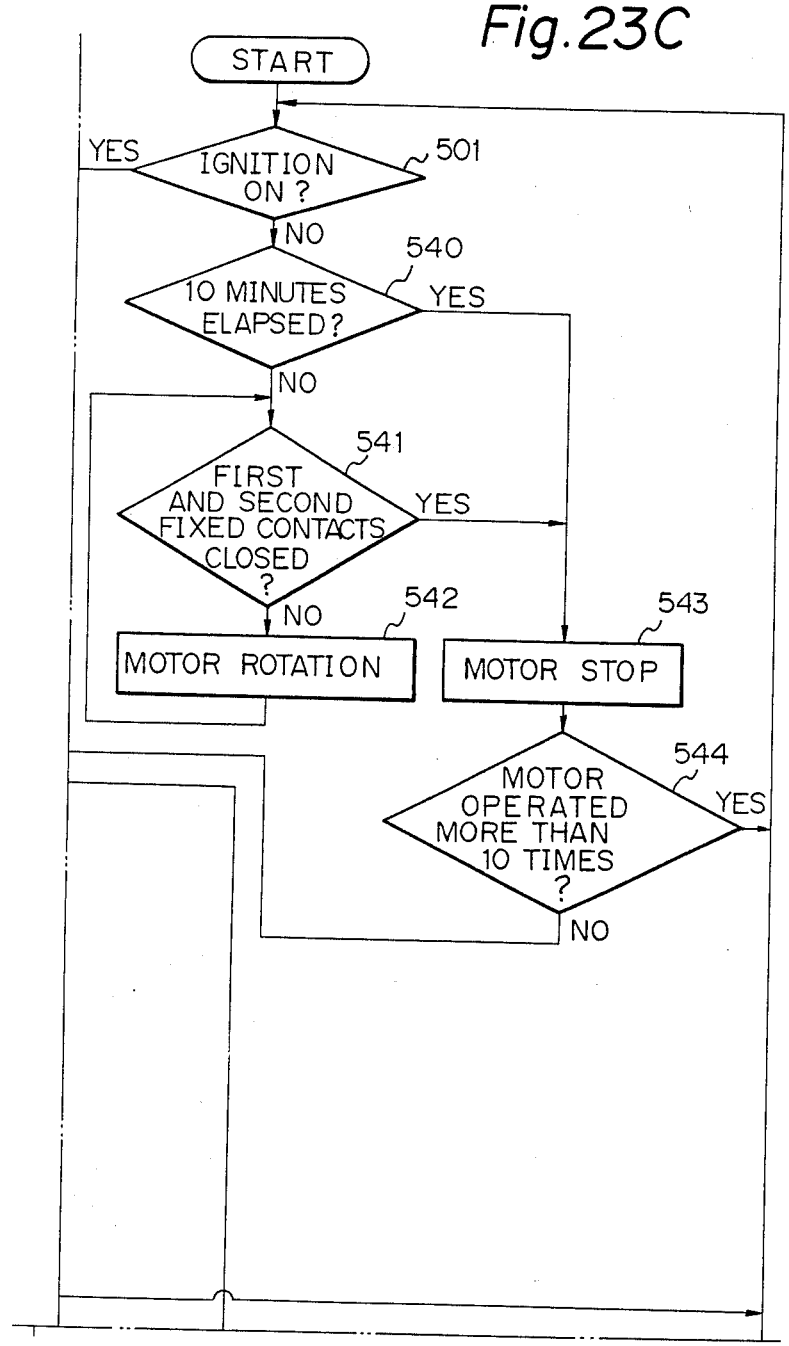
Figure 23D:
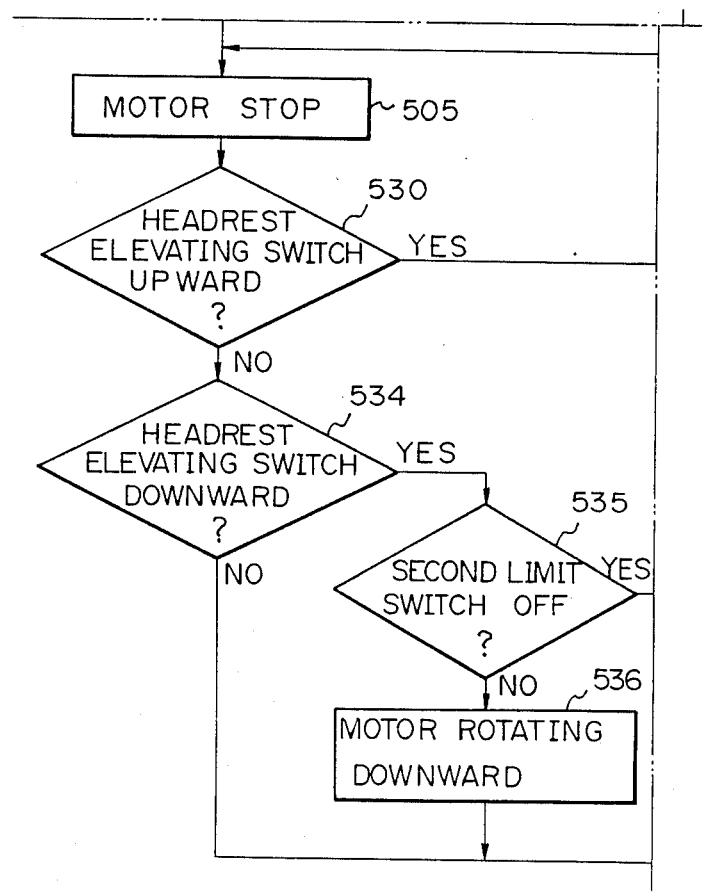
Figure 23E:
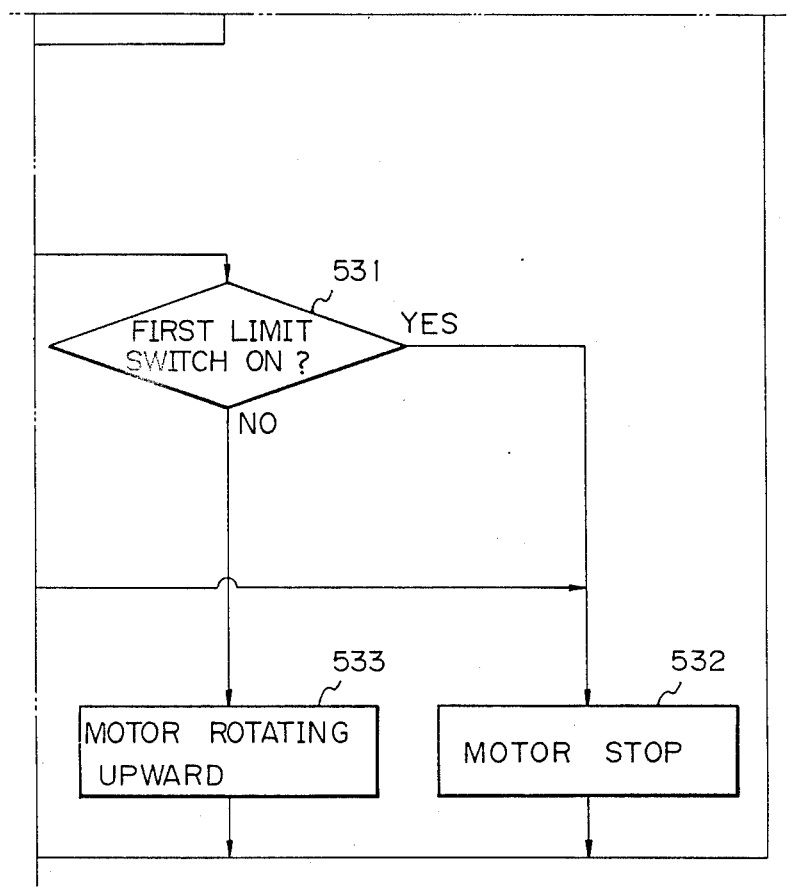

In step 501 (FIG. 23C), it is determined whether or not the engine key is in the ignition position. If the engine key is in the ignition position, the process goes to step 502 (FIG. 23A). Conversely, if the engine key is not in the ignition position, the process goes to step 540. In step 502, it is determined whether or not the transmission lever is in the R position. If the lever is in the R position, the process goes to step 510, and if the lever is not in the R position, the process goes to step 503. In step 510, it is determined whether or not 0.5 sec has elapsed since the transmission lever was moved to the R position. If 0.5 sec has not elapsed, the process goes to step 514 and the motor 41 for angular displacement is stopped. If more than 0.5 sec has elapsed, the process goes to step 511. In step 511, it is determined whether or not the rear seat sensor 416 is turned ON, that is, whether or not there is a rider or luggage on the rear seat. If the rear seat sensor 416 is turned ON, the process goes to step 514, and if the rear seat sensor 416 is turned OFF, the process goes to step 512. In step 512, it is determined whether or not the first and third fixed contacts 271, 273 are closed, i.e., whether or not the headrest 13 is angularly displaced to the back of the seat backrest 12. If the first and third fixed contacts 271, 273 are not closed, the process goes to step 513 and the rotation of the motor 41 is maintained, so that the headrest is tilted to the back position. Then, at step 514, the motor 41 is stopped and the process is returned to step 501.

Thus, if more than 0.5 sec has elapsed since the transmission lever was moved to the R position, and there is no rider or luggage on the rear seat, steps 501, 502, 510 through 514 are carried out, so that the headrest 13 is angularly displaced to the back of the seat backrest 12.

Conversely, if the process goes from step 502 to step 503, it is determined in step 503 whether or not the transmission lever is in the D (Drive) position. If the transmission lever is in the D position, the process goes to step 504 (FIG. 23B), and if the transmission lever is not in the D position, the process goes to step 520. In step 504, it is determined whether or not the first and second fixed contacts 271, 272 are closed, i.e., whether or not the headrest 13 is in the usual upright position. If the headrest 13 is in the usual upright position, the process goes to step 505 (FIG. 23D) and the motor 41 for angular displacement is stopped. If the headrest 13 is not in the usual upright position, the process goes to step 506 (FIG. 23B) and the motor 41 for angular displacement is rotated. Namely, when the transmission lever is in the D position, if the headrest 13 is not at the upright position, steps 501, 502, 503, 504, 506 are carried out in turn, so that the headrest 13 is returned to the upright position.

In step 503, when the transmission lever is not in the D position, it is determined in step 520 whether or not the headrest rotating switch 413 is set to the upright condition. If the switch 413 is set to the upright condition, the process goes to step 504, and if the switch 413 is not set to the upright condition, the process goes to step 521. Thus, when the headrest rotating switch 413 is set to the upright condition, steps 504, 506 are carried out and the headrest 13 is returned to the upright position, similar to the case in which the transmission lever is in the D position.

In step 521, it is determined whether or not the headrest rotating switch 413 is set to the headrest back condition. If the switch 413 is set to the headrest back condition, the process goes to step 522 (FIG. 23B), and it is determined whether or not the first and third fixed contacts 271, 273 are closed, i.e., whether or not the headrest 13 is positioned at the back of the seat backrest 12. If the headrest 13 is at the headrest back position, the process goes to step 514 and the motor 41 for angular displacement is stopped. If the headrest 13 is not at the headrest back position, the process goes to step 506 and the motor 41 for angular displacement is rotated. Thus, if the headrest rotating switch 413 is set to the headrest back position, steps 521, 522, and 506 are carried out and the headrest 13 is tilted to the back of the seat backrest 12.

In step 521, if the headrest rotating switch 413 is not set to the headrest back position, the process goes to step 523, and it is determined whether or not the first and second fixed contacts 271, 272 are closed, i.e., the headrest 13 is in the upright position. If the headrest 13 is in the upright position, the process goes to step 505 and the motor 41 for angular displacement is stopped, and if the headrest 13 is not in the upright position, the process is returned to step 501.

At step 505, the motor 41 for angular displacement is stopped, and then step 530 and the following steps are carried out. In step 530, it is determined whether or not the headrest elevating switch 412 is set to the upward condition. If the switch 412 is set to the upward condition, the process goes to step 531 (FIG. 23E), and it is determined whether or not the first limit switch 141 is turned ON, i.e., the headrest 13 is at the upper limit position. If the headrest 13 is at the upper limit position, the process goes to step 532 and the motor 51 for up and down movement is stopped. Conversely, if the headrest is not at the upper limit position, the process goes to step 533 and the motor 51 for up and down movement is rotated so that the headrest 13 is moved upward.

On the other hand, in step 530, if the headrest elevating switch 412 is not set to the upward condition, the process goes to step 534, and it is determined whether or not the headrest elevating switch 412 is set to the downward condition. If the headrest elevating switch 412 is set to the downward condition, the process goes to step 535, and it is determined whether or not the second limit switch 142 is turned ON, i.e., whether or not the headrest 13 is at the lower limit position. If the headrest 13 is at the lower limit position, the motor 51 for up and down movement is stopped in step 532, and conversely, if the headrest 13 is not at the lower limit position, the motor 51 for up and down movement is rotated in step 536 and the headrest 13 is moved downward.

Thus, the headrest 13 is moved up or down according to the operation of the headrest elevating switch 412. After steps 532, 533, and 536, the process is returned to step 501. If the headrest elevating switch 412 is not set to the downward condition, the headrest elevating switch 412 is not operated and the process is returned to step 501.

In step 501, if the engine key is not set to the ignition position, i.e., the engine key is turned OFF, the process goes to step 540, where it is determined whether or not 10 minutes has lapsed since the engine key was turned OFF. If 10 minutes has elapsed since the engine key switch was turned OFF, the process goes to step 541 and it is determined whether or not the first and second limit switches 271, 272 are closed, i.e., whether or not the headrest 13 is in the upright position. If the headrest 13 is not in the upright position, the process goes to step 542 and the motor 41 for angular displacement is rotated so that the headrest 13 is returned to the upright position. Thus, when 10 minutes has elapsed since the engine key switch was switched OFF, it is determined whether or not the headrest 13 is in the upright position, and if the headrest is not in the upright position, the motor 41 is driven so that the headrest 13 is returned to the upright position.

When it is determined that more than 10 minutes has lapsed since the engine key was turned OFF in step 540, and in step 541 it is determined that the first and second fixed contacts 271, 272 are closed, and thus the headrest is in the upright position, the process goes to step 543 and the motor 41 for angular displacement is stopped. In step 544, it is determined whether or not the motor 41 or the motor 51 have been turned ON or OFF more than 10 times since the engine key switch was turned OFF. If the number of ON-OFF operations of the motors 41, 51 is more than 10, the process is returned to step 501. That is, the maximum number of up and down movement and tilting operations of the headrest 13 after the engine key switch is turned OFF is 10. If the number of operations of the motors 41, 51 is less than 10 in step 544, the process goes to step 520, and the control by operation of the headrest rotating switch 413 is carried out. The control by operation of the headrest elevating switch 412 is carried out by step 530 and the following steps.

In the above embodiment, when the headrest is changed from the headrest back position to the upright position, only the motor 41 for angular displacement is rotated. However, when the headrest is changed from the upright position to the headrest back position, not only is the motor 41 for angular displacement rotated, but also the motor 51 for up and down movement may be rotated to move the headrest 13 up. Accordingly, when the headrest 13 is tilted, the lower end portions of the leg members 15, 16 approach the center of rotation of the headrest 13, so that the operation space required in the seat backrest 12 for tilting the headrest 13 is reduced. In this case, as shown in the flowchart of FIG. 23, the controls in steps 513, 506 are changed to the control in which the motor 41 for angular displacement is rotated and the motor 51 for up and down movement is rotated to move the headrest 13 up, and the control in step 514 is changed to the control of stopping the motors 41, 51.

In another embodiment of this invention, in addition to the angular displacing of the headrest 13 from the upright position to the headrest back position, when the headrest 13 is angularly displaced from the headrest back position to the upright position, the motor 51 for up and down movement is rotated to move the headrest 13 down, together with the rotation of the motor 41 for angular displacement. Accordingly, when the headrest 13 is returned to the upright position, the headrest 13 is returned to the height it was at before the headrest 13 was tilted to the headrest back position.

Further, when sensing the upper and lower positions and angular position of the headrest 13, the number of rotations of the motors 41, 51 may be sensed by a magnet and a Hall element.

Although embodiments of the present invention have been described herein with reference to the attached drawings, many modifications and changes may be made by those skilled in this art without departing from the scope of the invention.

We claim:

1. A device for moving up and down and tilting a headrest provided at an upper portion of a backrest of a seat mounted on a vehicle, said headrest having at least one leg member inserted in said seat backrest, said device comprising:
    a rotatable driven shaft extending horizontally and being provided in said seat backrest and operatively connected to said at least one leg member to move said headrest up and down,
    a drive mechanism driving said driven shaft to rotate about the axis thereof to move said headrest up and down relative to said seat backrest,
    a support member provided below said driven shaft, said at least one leg member being rotated about an axis of said support member, said axis being parallel to said rotatable driven shaft, and
    a tilting mechanism rotating said at least one leg member about said support member to tilt said headrest through a predetermined angle relative to said seat backrest.

2. A device according to claim 1, wherein said at least one leg member is formed with a rack, and said driven shaft has a pinion meshing with said rack.

3. A device according to claim 1, wherein said tilting mechanism has a link mechanism operatively connected to said at least one leg member, an output shaft connected to said link mechanism, a gear mechanism connected to said output shaft, a flexible shaft connected to said gear mechanism, and a motor rotating said flexible shaft.

4. A device according to claim 3, wherein said gear mechanism has a first gear provided on said output shaft, an intermediate shaft having a second gear meshing with said first gear and a worm wheel, and a worm provided on said flexible shaft and meshing with said worm wheel.

5. A device according to claim 3, wherein said at least one leg member is in a usual upright state when the rotation of said motor causes said link mechanism to be positioned at a bottom dead center, and said at least one leg member is in a retracted position behind the backrest when the rotation of said motor causes said link mechanism to be positioned at a top dead center.

6. A device for moving up and down and tilting a headrest provided at an upper portion of a backrest of a seat mounted on a vehicle, said headrest having at least one leg member inserted in said seat backrest, said device comprising:
    a rotatable driven shaft provided in said seat backrest and operatively connected to said at least one leg member to move said headrest up and down, said driven shaft having a first gear,
    a support member provided below said driven shaft and having a second gear meshing with said first gear, said at least one leg member being rotated about said support member,
    a drive mechanism driving said second gear to rotate driven shaft about the axis thereof to move said headrest up and down relative to said seat backrest, and
    a tilting mechanism rotating said at least one leg member about said support member to tilt said headrest through a predetermined angle relative to said seat backrest.

7. A device according to claim 6, wherein said drive mechanism has an output shaft connected to said second gear, a gear mechanism connected to said output shaft, a flexible shaft connected to said gear mechanism and a motor rotating said flexible shaft.

8. A device according to claim 7, wherein said gear mechanism has a first worm wheel provided on said output shaft, an intermediate shaft formed with a second worm wheel and a first worm meshing with said first worm wheel, and a second worm provided on said flexible shaft and meshing with said second worm wheel 9. A device according to claim 8, wherein said output shaft is formed with a flange portion and provided with a friction plate, said first worm wheel being rotatably fitted to said output shaft and sandwiched by said flange portion and said friction plate, so that said first worm wheel rotates relative to said output shaft if a rotational force transmitted to said first worm wheel from said motor is greater than a friction force generated by said friction plate.

10. A device according to claim 6, wherein said drive mechanism does not rotate said second gear when said tilting mechanism rotates said at least one leg member.

11. A device according to claim 6, wherein said drive mechanism rotates said second gear to move said leg member up when said tilting mechanism rotates said at least one leg member.

12. A device for moving up and down and tilting a headrest provided at an upper portion of a backrest of a seat mounted on a vehicle, said headrest having at least one leg member inserted in said seat backrest, said device comprising:

a rotatable driven shaft provided in said seat backrest and operatively connected to said at least one leg member to move said headrest up and down, a drive mechanism driving said driven shaft to rotate about the axis thereof to move said headrest up and down relative to said seat backrest, a support member provided below said driven shaft, said at least one leg member being rotated about said support member, and a tilting mechanism having a link mechanism operatively connected to said at least one leg member, an output shaft connected to said link mechanism, a gear mechanism connected to said output shaft, a flexible shaft connected to said gear mechanism, and a motor rotating said flexible shaft, said gear mechanism having a first gear provided on said output shaft, an intermediate shaft having formed thereon a second gear meshing with said first gear and a worm wheel, and a worm provided on said flexible shaft and meshing with said worm wheel, said worm wheel being rotatable relative to said second gear and slidably engagable with said second gear so that said worm wheel rotates relative to said second gear is a rotational force transmitted to said worm wheel from said motor is greater than a friction force generated between said worm wheel and said second gear, said tilting mechanism rotating said at least one leg member about said support member to tilt said headrest through a predetermined angle relative to said seat backrest.

* * * * *